Figure 7:
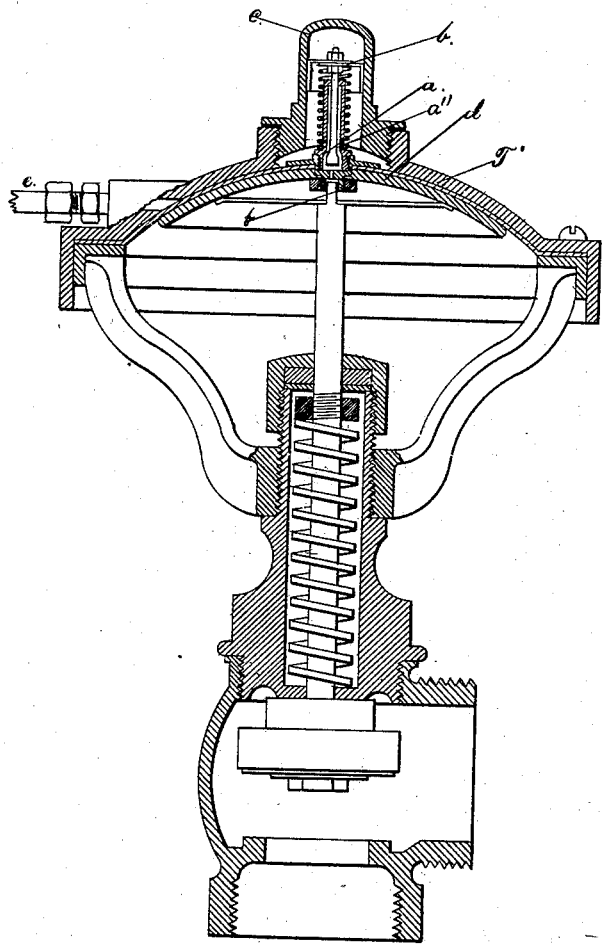

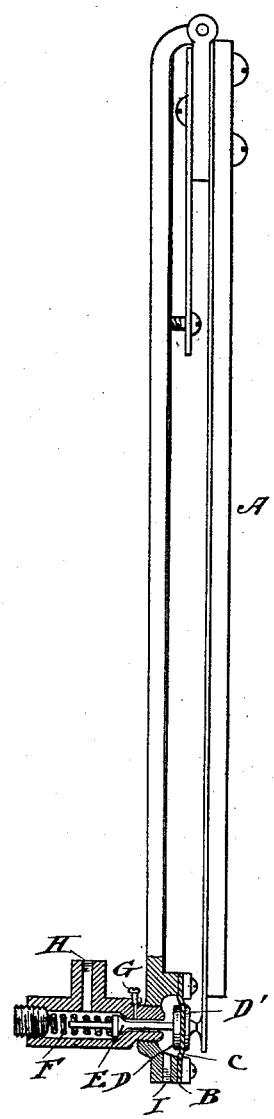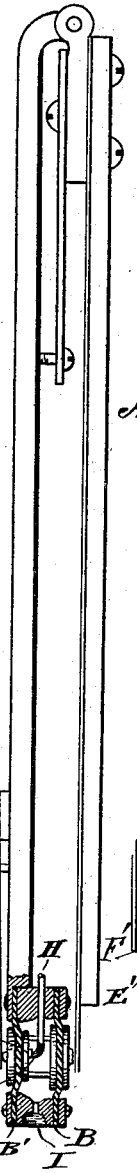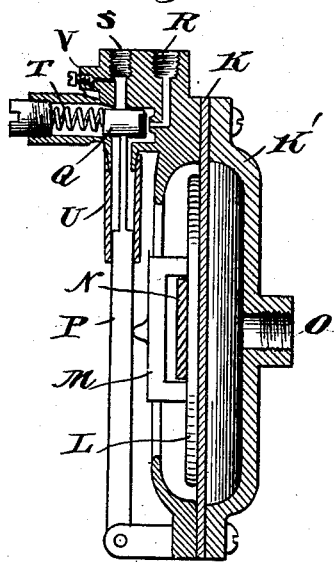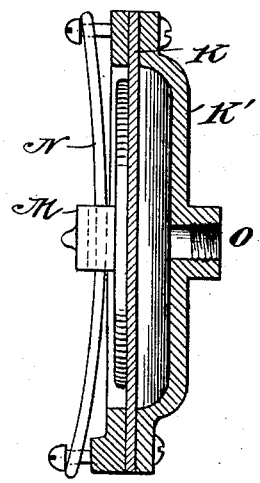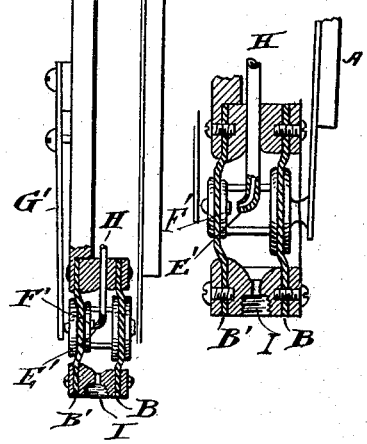

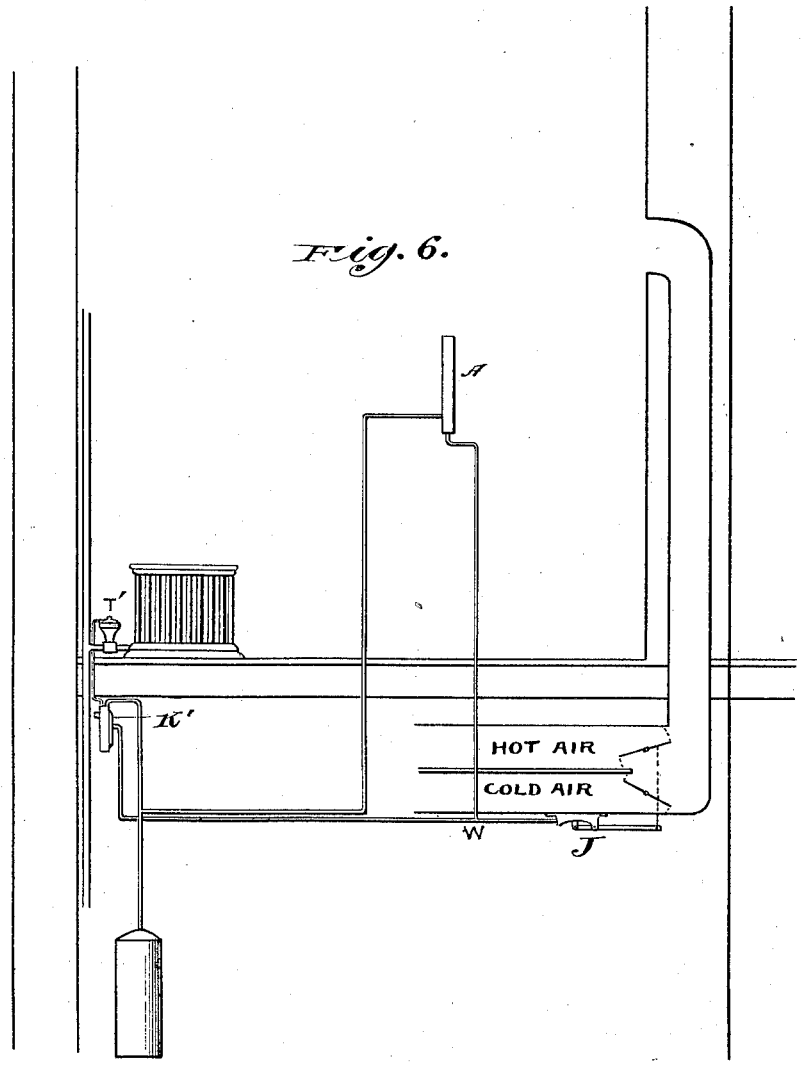

No. 722,251. PATENTED MAR. 10, 1903.
W. P. POWERS.
MEANS FOR REGULATING THE TEMPERATURE IN HEATING SYSTEMS.
APPLICATION FILED DEC. 26, 1896.
NO MODEL.
3 SHEETS—SHEET 3.

Witnesses:
H. B. Houghtaling
F. N. Lowder

Inventor
William P. Powers

United States Patent Office.

WILLIAM P. POWERS, OF CHICAGO, ILLINOIS.

MEANS FOR REGULATING THE TEMPERATURE IN HEATING SYSTEMS.

SPECIFICATION forming part of Letters Patent No. 722,251, dated March 10, 1903.

Application filed December 26, 1896. Serial No. 617,122. (No model.)

*To all whom it may concern:*

Be it known that I, WILLIAM P. POWERS, a citizen of the United States, residing at Chicago, in the county of Cook and State of Illinois, have invented certain new and useful Improvements in Means for Regulating Temperature in Connection with Heating Systems, of which the following is a full and complete specification.

The object of the invention is to provide thermostatic means by which air or other fluid pressure may be utilized to control valves through which steam is supplied to radiators and to operate dampers controlling the flow of air-currents used for heating and ventilating. It is common to use in the heating of the same apartments radiators located therein and also air-ducts through which heated air is delivered, both of which serve to maintain a proper degree of heat in the apartment. In accordance with the best practice it is desirable that the dampers should be operated by a graduated movement, as shown and described in patents issued to me, No. 558,610, dated April 21, 1896, and No. 554,398, dated February 11, 1896, while in the control of steam-radiators it is necessary that the action should be prompt and decisive, as provided for in the apparatus described in Patent No. 555,660, dated March 3, 1896, issued to W. P. Powers and F. W. Powers.

It is the purpose of this invention to provide a special form of thermostat and means by which a single thermostat may be made to operate air-dampers with a graduated motion proportionate to the temperature of the apartment and at the same time, if desired, operate valves supplying steam to direct radiators that may be used in the rooms in connection with the hot-air system, the steam being turned on or off with a positive motion at any desired degree of temperature. It is evident that to secure this result the thermostat must be able to maintain a graduated air-pressure in the damper-controlling devices and also must at the proper time cause the delivery to the valve-controlling motor of a positive air-pressure of sufficient force to effectually and promptly close the valve against the ordinary pressure employed in steam-heating plants. To secure such double action I have provided the necessary devices, hereinafter described.

In the patents referred to above the thermostatic action is primarily secured by the expansion of a chamber in which a volatile liquid is confined, the movement secured thereby being utilized to open air-passages through which air or other fluid pressure is delivered to the motor which controls the damper or valve. In the present invention I use, preferably, the well-known form of thermostatic bar, composed of two strips having dissimilar rates of expansion when heated. It is usual to employ for this purpose vulcanite and brass, the vulcanite having a much higher rate of expansion for each degree of added temperature. These two materials being firmly united form a compound strip, which being attached rigidly at one end to the frame of the thermostat produces at the other or free end a movement whenever the temperature is increased or diminished. The power obtained from this thermostatic bar I utilize to open a valve and permit fluid-pressure to pass through to the motor connections. This fluid-pressure also reacts against the power exerted by the thermostatic bar, as hereinafter described.

Figure 1 is a sectional view of this thermostatic bar and the frame to which it is attached and the valve-chamber with its valve and operating mechanism. Fig. 2 shows a modified form of construction, and Fig. 3 an enlarged detail of the valve-chamber of same, the general principle involved in both being the same. Fig. 4 is a sectional view of the relay-valve. Fig. 5 is a sectional view of the same, taken at right angles to that shown in Fig. 4 and showing the diaphragm and its resisting-spring. Fig. 6 is a diagrammatic view of the various parts as applied in an operative system. Fig. 7 is a sectional view of a valve and one form of motor for operating same provided with devices for causing the valve to open and close with a positive motion.

The air-pressure directly secured by either of these forms of thermostats is a graduated one and is used in the motor-chamber controlling the air-dampers. The pressure of the air passing through the thermostat, as hereinafter described, within certain limits increases in direct proportion to the increase of temperature, and I provide in the case as presented a relay attachment (shown in section in Figs. 4 and 5) by means of which this increasing pressure is enabled at any predetermined point to open an auxiliary valve and deliver the air or fluid pressure to the valve-controlling motor, this air-pressure being obtained ordinarily from the same source as that which passes through the thermostat. The result of this combination is that the dampers are operated with a graduated motion, while at the proper time the steam-valves are operated upon by the full pressure of the fluid used.

Referring again to Fig. 1, A is the thermostatic bar. At its lower or free end is the valve E, with its stem reaching through the valve-housing and being in contact with the plate D, between which and the plate D' is a diaphragm B, composed of any suitable elastic material. This diaphragm constitutes the movable wall of a pressure-chamber at the lower end of the frame, into which air is admitted when the valve E is unseated. Leading out from this chamber is the opening I, from which connection is made to an ordinary pressure-motor, by which the dampers are operated, as shown at J in Fig. 6. This device being well known, I have not deemed it necessary to provide a detailed drawing. The air-pressure is maintained in a tank by a suitable air-compressor and is supplied to the thermostat through a pipe connected at the opening H. The valve E is maintained in a closed position by the coil-spring F. The free end of the thermostatic bar under the influence of a rising temperature presses against the center of the plate D' and, overcoming the tension of the spring F and the air-pressure exerted upon the valve E when closed, results in an opening of said valve. The air-pressure is thus permitted to flow through into the chamber and through the opening I to the damper-operating motor. This air-pressure operates against the diaphragm B and tends to overcome the pressure afforded by the thermostatic bar, so that when an amount of air-pressure exists in the chamber sufficient to balance the pressure of the thermostatic bar the valve E returns to its seat and the further admission of air is prevented. Should the temperature from any cause rise still higher, the pressure of the thermostatic bar will be increased and the valve will open until a sufficient amount of air has entered the chamber to balance this increased pressure, whereupon the valve will again close, and thus limit the amount of air-pressure to whatever is necessary to balance the pressure afforded by the thermostatic bar.

To provide for the escape of the fluid-pressure from the chamber and motor connected therewith, I use a valve G, by which the escape-opening can be restricted, so that only a small amount of air can escape through it. If the temperature remains fixed, it is evident that on account of the air escaping through valve G the pressure in the chamber will become less, and this will result in the unseating of the valve E and the admission of a further supply of air to maintain the equilibrium between the air-pressure and the power exerted by the thermostatic bar. If now through a falling temperature the free end of the thermostatic bar recedes from contact with the flange D', the valve E remaining seated, the air in the chamber and in the motor connected therewith will soon be depleted and the dampers operated thereby will return to their normal position under the influence of the spring usually located in the motor J. In the pipe connecting the opening I with the motor J, I locate a branch connection at W, Fig. 6, to the relay K'. (Shown in transverse sections in Figs. 4 and 5.) This relay consists of a diaphragm K, forming, with the hollow shell K', a pressure-chamber. The branch pipe through which the air enters is connected at O. Bearing against the outside of the diaphragm is the piston-flange L, provided with a bridge M, through which passes an adjustable spring N, which resists the outward movement of the diaphragm K when pressure is brought to bear on same. Upon the bridge is a central projection in contact with the lever P, fulcrumed at one end and at the other connected with the valve Q, which controls the passage of the air-pressure from the inlet R to the delivery-port S. The valve Q is held normally closed by the spring T, and the lever which actuates this valve is encircled by an elastic tube U, which connects the valve-housing and the lever and prevents the air-pressure in the valve-chamber from escaping and yet permits of free motion to the lever. At V, I show a small escape-valve, through which a gradual discharge of air is permitted from the pipe leading from S to the valve-operating motor, (shown at T' in Fig. 6.) Fig. 6 is a diagrammatic view of the complete system in operation, showing the air-tank, the steam-radiator, the hot and cold air dampers, the thermostat, and the relay K', by which the positive air-pressure is delivered to the valve-motor.

Referring to Fig. 4, it will be seen that whenever the pressure entering at O develops sufficient power to overcome the tension of the spring N it will result in the opening of the valve Q and the passage through from R to S of the full amount of air-pressure used in the system. This air-pressure enters the valve-motor T', (shown in detail in Fig. 7 of the drawings,) attached to a valve such as is ordinarily used in connection with steam-radiators. It is evident that the expansion of the materials of which the thermostatic bar is composed results in the gradual opening and closing of the air-valve in the thermostat, and it becomes necessary, therefore, to provide means whereby this gradually increasing or diminishing pressure shall result in a positive and quick movement of the valve controlling the supply of heat. For this purpose I provide the fluid-pressure motor with an automatic escape-valve $a$. This escape-valve is of such construction and so connected with the fluid-pressure motor that it permits the motor fluid to escape during the initial action of the thermostat and until such time as the valve controlling the motor-fluid supply is opened sufficiently to admit the passage of an excess of fluid-pressure over that passing through the open escape-valve $a$ sufficient to preponderate over the tension of the spring, which tends to hold the main valve open. The housing of the escape-valve $a$ is attached to the piston-plate $d$ of the motor. Below the valve there is an opening down through the piston-plate, the stem of the main valve fitting loosely therein. At the upper end of the drag-valve $a$ is attached a drag $b$, which slides up and down in the drag-chamber $c$ whenever the main valve is opened or closed. When the main valve is open, the drag-valve $a$ is also open, owing to the friction of the drag in the chamber when the upward movement of the piston occurs in the opening of the main valve. The air-pressure for operating the motor enters through the connection $e$, and it first escapes between the valve $a$ and its housing and through the passage underneath in the piston-plate. Whenever the motor is actuated sufficiently to close the escape-valve $a$ through the retarding action of the drag $b$, the full pressure of the motor fluid becomes operative at once and causes the motor to act quickly to close the valve controlling the supply of heat. When the temperature has fallen, the thermostat shuts off or reduces the supply of fluid to the motor.

At V, Fig. 4 of the drawings, is shown an escape-valve which is permanently open and which permits the escape of a small amount of the motor fluid, and this results when the supply has been reduced or cut off in gradually depleting the motor fluid and permitting a return movement of the motor-piston, due to the spring surrounding the valve-stem, and which tends to open the heat-controlling valve. As soon as this retrograde movement commences the escape-valve $a$ is unseated by the retarding action of the drag $b$, thereby opening a passage to the atmosphere for the motor fluid and permitting an immediate and complete opening of the valve controlling the supply of heat. To facilitate the passage of the air through the escape-valve $a$, the housing of same is provided with lateral openings. (Indicated on Fig. 7 as $a''$.) This device is a part of the subject-matter described and claimed in Patent No. 555,660, issued March 3, 1896, to W. P. Powers and F. W. Powers. It will thus be seen that the dampers will be handled by a graduated pressure passed through and determined by the thermostat, while at the proper time the relay attachment shown in Fig. 4 or an equivalent device will open an auxiliary valve and cause the delivery of the air-pressure at its full power into the valve-operating motor, and this will result in the prompt and effectual closing of the steam-valve and no effect will be exerted upon the air controlling the dampers, the pressure in the motor controlling these remaining the same as if there were no secondary attachment.

Referring now to Fig. 2, I have provided in this form of thermostat a different valve mechanism, with the idea of overcoming friction and to a certain extent the resistance due to the pressure of the air upon the valve and diaphragm. To accomplish this result, I use two diaphragms B and B', B being usually slightly larger than B'. Between these two diaphragms I arrange a double piston-plate open in the center, the two parts being connected by pillars, so that it is practically one piece. On the outside of both the diaphragms are provided piston-plates, each of which is firmly attached to the inside plate, so that both diaphragms, with the attached plates, move together as one. On the inner side of the piston-plate connected to the smaller diaphragm I provide at E' an opening for the admission of air-pressure so arranged as to be closed by a pad, usually of rubber or leather, attached to the center of the inner plate, as indicated by F'. I represents an opening to which the pipe is attached leading to the damper-operating motor. Behind the frame of the thermostat is an adjustable spring G', by which the diaphragms are maintained in opposition to the pressure of the thermostatic bar and by which when the thermostatic pressure is withdrawn the pad F' is brought in contact with the discharge-opening and the further admission of air-pressure prevented.

Fig. 3 is an enlarged detail of the diaphragms and valve mechanism, the corresponding parts being lettered similarly in each figure.

In Figs. 2 and 3 the diaphragms are made of different size, as before stated, in order that there may be an excess of force exerted by the air in the pressure-chamber in the direction of closing the aperture E'. The object of this is that the air-pressure may exert a power in opposition to that afforded by the thermostatic bar. It is evident that this would not be the case if the two diaphragms were of exactly the same size, as the pressure would then be the same in both directions. It will be seen that the effect of this double-diaphragm combination, with one diaphragm larger than the other, is the same as in Fig. 1, where the whole pressure is exerted upon the single diaphragm in opposition to the thermostat.

I am aware that thermostats have been made operating upon a similar principle to the one here shown, where the air-pressure acts in opposition to the thermostatic power, as this principle is involved in the patents above referred to. The invention in this case, as shown in Fig. 1, consists in the application of the compound thermostatic bar as distinguished from those devices in which an expansible liquid is used. With this form of thermostat the pressure afforded by the movable part depends solely upon temperature conditions, expansion and contraction of the materials of which it is composed being due to heat and independent of other forces.

In the device shown in Fig. 2 I do not limit myself to this particular construction, as any form of thermostatic bar may be used in connection with the double diaphragm and valve action and still be within the limit of my invention. Also the two diaphragms may be of the same size, the device constituting a substitute for a stuffing-box, whereby motion may be communicated from the outside to the inside of a sealed chamber, avoiding the friction due to a rod passing through a packed joint. Neither do I limit myself to the form of thermostat and relay attachment herein shown, as any thermostat arranged to deliver through one motor-pipe a graduated air-pressure proportional to the temperature of the thermostat and through another motor-pipe a substantially positive air-pressure at a predetermined temperature of the thermostat, both being arranged to operate in a concurrent manner to raise or lower the temperature of an apartment, will be within the limit of my invention.

Having thus described my invention, what I claim, and desire to secure by Letters Patent, is the following:

1. In a heat-controlling apparatus, the combination with a damper-controlling motor, of an expansible thermostatic bar, a valve operated thereby, controlling the admission to the motor of fluid-pressure, and means whereby this pressure acts in opposition to the force exerted by the thermostatic bar, substantially as described.

2. In a heat-controlling apparatus, the combination with a thermostatic bar, of two diaphragms operated thereby, forming a closed chamber, a valve admitting fluid-pressure to said chamber, arranged to be closed by contact with one of the diaphragms, a fluid-pressure motor and pipe connections between the chamber and the motor, substantially as described.

3. In a heat-controlling apparatus, the combination with a thermostatic bar, of two diaphragms operated thereby, one of them larger than the other, forming a closed chamber, a valve admitting fluid-pressure to said chamber, arranged to be closed by contact with one of the diaphragms, a fluid-pressure motor and pipe connections between the chamber and the motor, substantially as described.

4. In a heating and temperature-regulating system, the combination of a radiator situated in an apartment, an air-duct leading to said apartment, a damper located in said air-duct and a motor controlling same, operated by a graduated fluid-pressure, thermostatically maintained; a second motor and a valve operated thereby, for controlling the supply of steam to the radiator, a source of fluid-pressure for each, and means whereby the graduated fluid-pressure shall control the admission of the actuating fluid-pressure to the second motor, substantially as described.

5. In a heating and temperature-regulating system, the combination of a radiator situated within an apartment, an air-duct leading to said apartment, a damper located in said air-duct and a motor controlling same, operated by a graduated fluid-pressure, thermostatically maintained; a second motor and a valve operated thereby for controlling the supply of steam to the radiator, a source of fluid-pressure for each, and adjustable means whereby the graduated fluid-pressure shall, at predetermined temperatures of the thermostat, control the admission of the actuating fluid-pressure to the second motor, substantially as described.

6. In a heating and temperature-regulating system, the combination of a radiator situated within an apartment, a supply-valve for the radiator, having a positively-operated fluid-pressure motor, an air-duct leading to said apartment, a damper for the air-duct, a motor for same operated by a graduated fluid-pressure proportionate to the temperature of the room which is to be heated, and a thermostat in said room, for governing the movement of the valve and of the damper, substantially as described.

WILLIAM P. POWERS.

Witnesses:
F. W. POWERS,
H. M. POTTER.